United States Patent
Yamamoto et al.

(10) Patent No.: US 6,181,481 B1
(45) Date of Patent: Jan. 30, 2001

(54) OBJECTIVE LENS FOR ENDOSCOPE

(75) Inventors: Chikara Yamamoto; Hitoshi Miyano, both of Omiya (JP)

(73) Assignee: Fuji Photo Optical Co., Ltd., Saitama (JP)

(*) Notice: Under 35 U.S.C. 154(b), the term of this patent shall be extended for 0 days.

(21) Appl. No.: 09/429,604

(22) Filed: Oct. 29, 1999

(30) Foreign Application Priority Data

Nov. 30, 1998 (JP) .................................................. 10-338782

(51) Int. Cl.$^7$ ............................. G02B 21/02; G02B 27/42
(52) U.S. Cl. .......................... 359/661; 359/558; 359/660
(58) Field of Search .................... 359/656, 657, 359/658, 659, 660, 661, 558

(56) References Cited

U.S. PATENT DOCUMENTS

| | | | |
|---|---|---|---|
| 5,841,586 | * 11/1998 | Nagaoka et al. | 359/654 |
| 5,999,327 | * 12/1999 | Nagaoka | 359/661 |
| 5,999,334 | * 12/1999 | Kohno | 359/736 |

FOREIGN PATENT DOCUMENTS

| | | |
|---|---|---|
| 02188709 | 7/1990 | (JP) . |
| 10197806 | 7/1998 | (JP) . |

* cited by examiner

*Primary Examiner*—Scott J. Sugarman
(74) *Attorney, Agent, or Firm*—Snider & Associates; Ronald R. Snider

(57) ABSTRACT

An endoscope objective lens comprises, successively from the object side, a first lens group $G_1$ constituted by a first lens $L_1$ made of a planoconcave lens having a concave surface directed onto the image side and a second lens $L_2$ made of a convex meniscus lens having a convex surface directed onto the object side, a stop 1, and a second lens group $G_2$ having a positive refracting power, wherein the image-side surface of the first lens $L_1$ is formed as a diffraction optical surface. This endoscope objective lens further satisfies the following conditional expressions:

$$E > 0 \qquad (1)$$

$$-2.0 < f_N/f < -0.3 \qquad (2)$$

where E is the coefficient of the second-order term of the phase difference function of the diffraction optical surface; $f_N$ is the focal length of the lens having the diffraction optical surface and the strongest negative refracting power in the first lens group; and f is the focal length of the whole lens system. This endoscope objective lens favorably corrects chromatic aberration in magnification in particular, and reduces adverse effects of unnecessary diffracted light, flare light occurring due to errors in manufacture or the like, and so forth, thus being applicable to the achievement of a higher resolution.

4 Claims, 7 Drawing Sheets

EXAMPLE 1

EXAMPLE 2

EXAMPLE 3

EXAMPLE 4

EXAMPLE 5

EXAMPLE 6

EXAMPLE 7

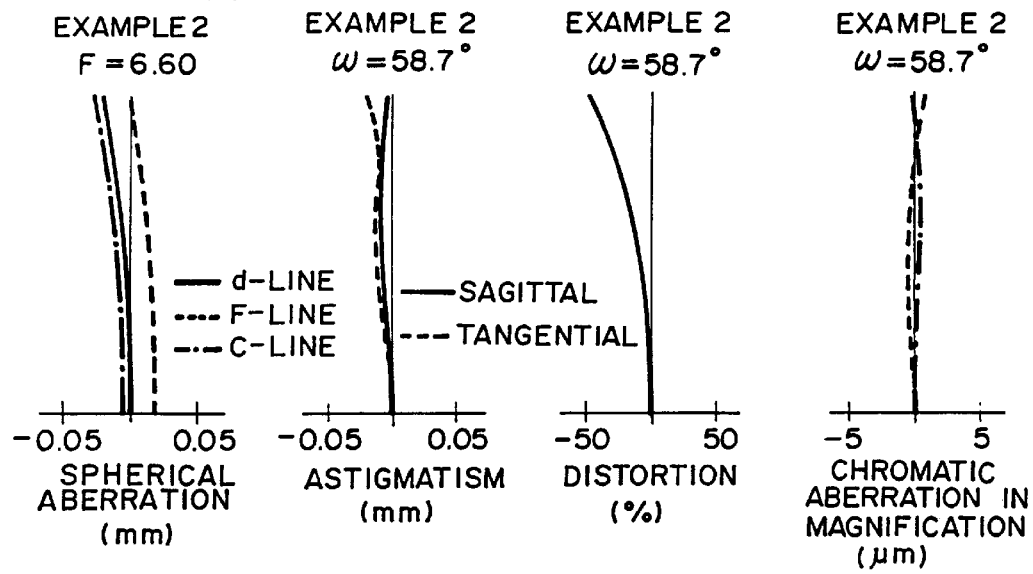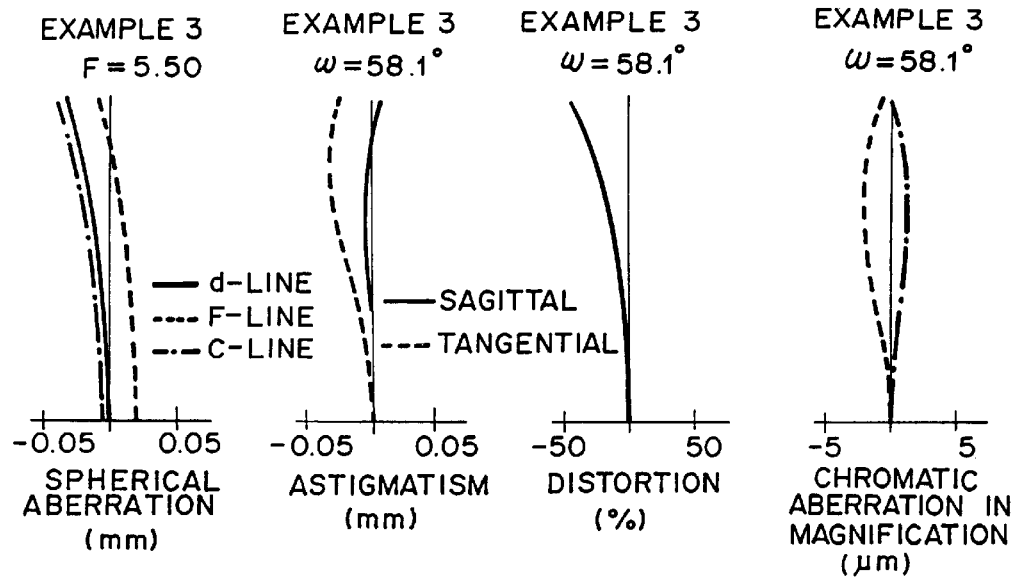

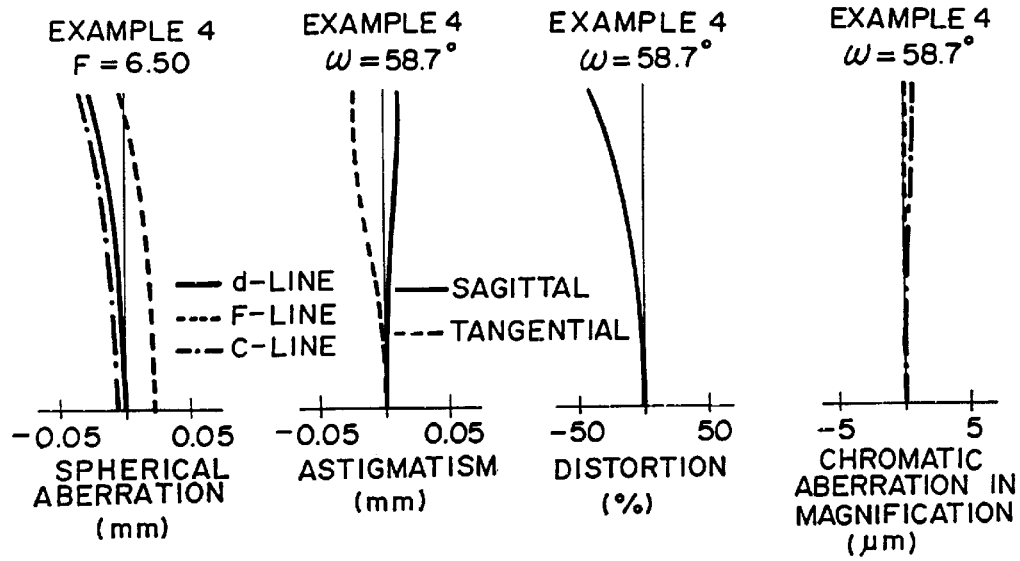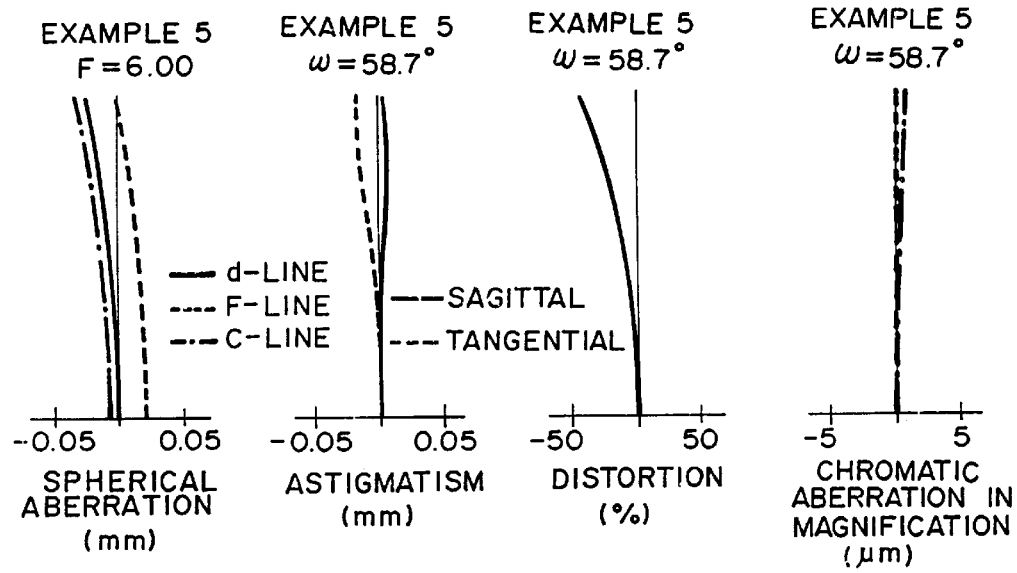

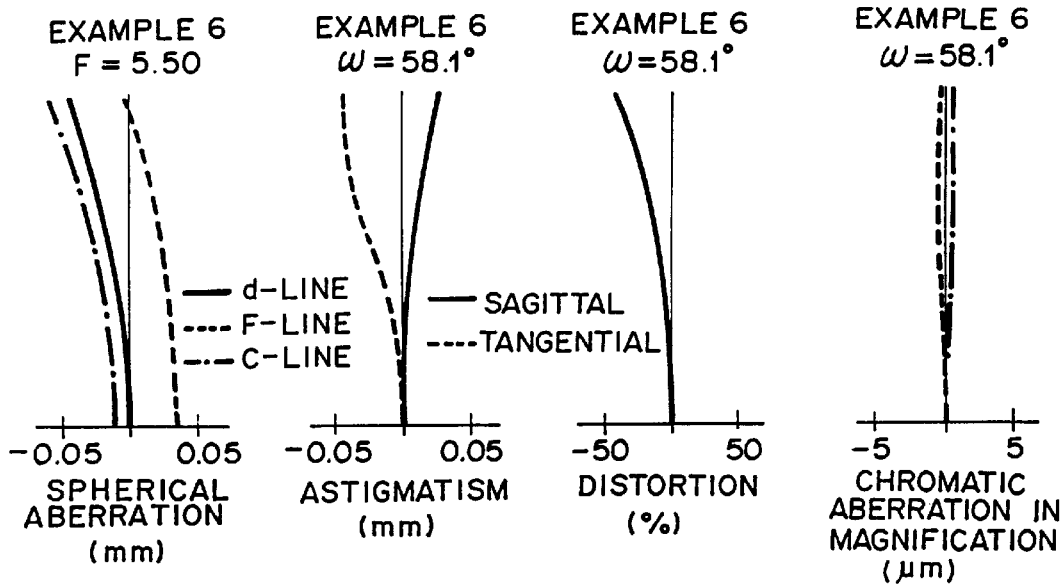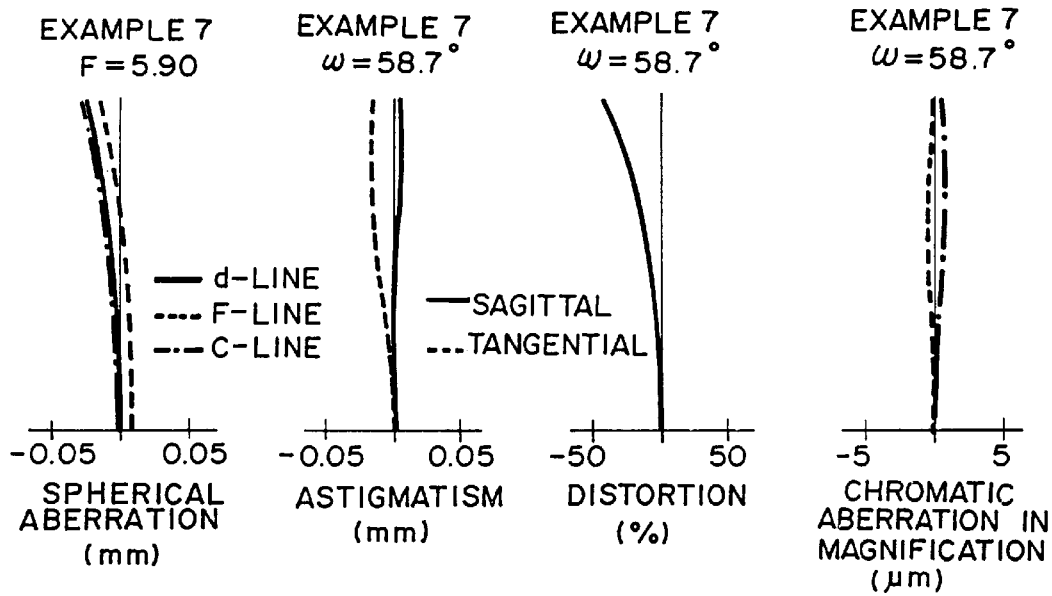

OBJECTIVE LENS FOR ENDOSCOPE

RELATED APPLICATIONS

This application claims the priority of Japanese Patent Application No. 10-338782 filed on Nov. 30, 1998, which is incorporated herein by reference.

BACKGROUND OF THE INVENTION

1. Field of the Invention

The present invention relates to an objective lens disposed at a front end portion of an endoscope; and, in particular, to an objective lens for an endoscope, which matches a high-resolution imaging device used for transmitting image information.

2. Description of the Prior Art

In general, a lens having a wide angle of view and a long back focus is required as an objective lens for an endoscope. Also, for carrying out highly accurate viewing and precise diagnosis, it is important to correct chromatic aberration. For example, an objective lens for an endoscope has already been disclosed in commonly-assigned Japanese Unexamined Patent Publication No. 2-188709 as one satisfying the requirements mentioned above.

Recently, however, as CCD devices and image fibers used for image transmission have been attaining higher resolutions, lenses with higher resolutions have been demanded. In view of a higher resolution in the device used for image transmission, the endoscope objective lens disclosed in Japanese Unexamined Patent Publication No. 2-188709 needs to further improve its chromatic aberration in magnification.

On the other hand, there has been known an objective lens using an optical system equipped with a diffraction optical surface (hereinafter referred to as "diffraction optical element") as means for correcting chromatic aberration. The diffraction optical element has an Abbe number of $v_d = -3.45$, whereby its dispersion is greater than that of a normal glass lens by one digit while having an opposite polarity. Hence, it is advantageous in that chromatic aberration can effectively be corrected to an extent which is unpredictable from the normal lens. An example of such an endoscope objective lens is disclosed in Japanese Unexamined Patent Publication No. 10-197806.

The endoscope objective lens disclosed in Japanese Unexamined Patent Publication No. 10-197806, however, may be disadvantageous in that diffracted light of different orders forming unnecessary light in terms of design generated due to the use of a diffraction optical element, flare light occurring due to errors in manufacture or the like, and so forth affect the achievement of a higher resolution.

SUMMARY OF THE INVENTION

In view of such circumstances, it is an object of the present invention to provide an endoscope objective lens which, while favorably correcting aberrations, such as chromatic aberration in magnification in particular, by using a diffraction optical element, reduces light which may affect the achievement of such a higher resolution.

In one aspect, the endoscope objective lens in accordance with the present invention comprises, successively from an object side, a first lens group having at least one lens with a negative refracting power, a stop, and a second lens group having a positive refracting power, the first lens group including at least one lens having a diffraction optical surface, the diffraction optical surface satisfying the following conditional expression (1):

$$E > 0 \quad (1)$$

where

E is the coefficient of the second-order term of the phase difference function of the diffraction optical surface.

Preferably, in the endoscope objective lens in accordance with the present invention, the first lens group includes at least one lens with a negative refracting power having a diffraction optical surface, whereas a lens having the strongest negative refracting power as the lens having the diffraction optical surface in the first lens group satisfies the following conditional expression (2):

$$-2.0 < f_N/f < -0.3 \quad (2)$$

where $f_N$ is the focal length of the lens having the diffraction optical surface and the strongest negative refracting power in the first lens group; and f is the focal length of the whole lens system.

Preferably, in the endoscope objective lens in accordance with the present invention, the first lens group includes at least one lens with a negative refracting power having a diffraction optical surface, whereas a lens having the strongest negative refracting power as the lens having the diffraction optical surface in the first lens group satisfies the following conditional expression (3):

$$f_N/f < -100 \quad (3)$$

where $f_N$ is the focal length of the lens having the diffraction optical surface and the strongest negative refracting power in the first lens group; and f is the focal length of the whole lens system.

In another aspect, the endoscope objective lens in accordance with the present invention comprises, successively from an object side, a first lens group having at least one lens with a negative refracting power, a stop, and a second lens group having a positive refracting power, the first lens group including at least one lens with a positive refracting power having a diffraction optical surface, a lens having the strongest positive refracting power as the lens having the diffraction optical surface in the first lens group satisfying the following conditional expressions (4) and (5):

$$E > 0 \quad (4)$$

$$1.0 < f_P/f \quad (5)$$

where

E is the coefficient of the second-order term of the phase difference function of the diffraction optical surface;

$f_P$ is the focal length of the lens having the diffraction optical surface and the strongest positive refracting power in the first lens group; and f is the focal length of the whole lens system.

Here, "phase difference function of the diffraction optical surface" is one represented by following expression.

$$\Phi(Y) = EY^2 + FY^4 + GY^6 + HY^8 + IY^{10}$$

BRIEF DESCRIPTION OF THE DRAWINGS

FIGS. 9A to 9D are aberration charts of the endoscope objective lens in accordance with Example 2;

FIGS. 10A to 10D are aberration charts of the endoscope objective lens in accordance with Example 3;

FIGS. 11A to 11D are aberration charts of the endoscope objective lens in accordance with Example 4;

FIGS. 12A to 12D are aberration charts of the endoscope objective lens in accordance with Example 5;

FIGS. 13A to 13D are aberration charts of the endoscope objective lens in accordance with Example 6; and FIGS. 14A to 14D are aberration charts of the endoscope objective lens in accordance with Example 7.

DESCRIPTION OF THE PREFERRED EMBODIMENTS

In the following, first to third embodiments of the present invention will be explained with reference to drawings.

Figure 1:
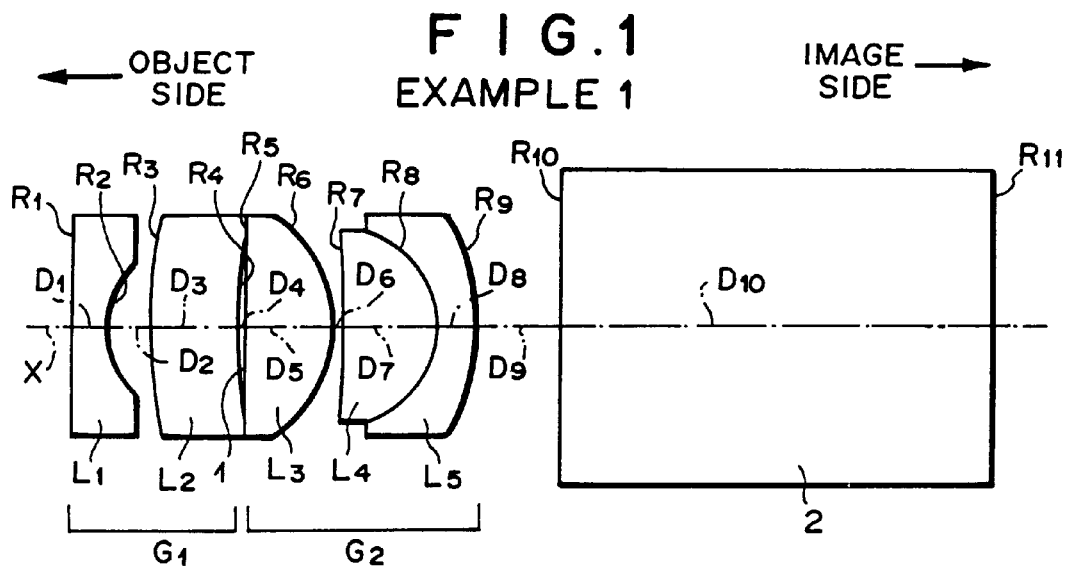
FIG. 1 is a view showing the configuration of the endoscope objective lens in accordance with Example 1.

Here, FIG. 1 shows the basic lens configuration of Example 1 as a representative of the first embodiment of the present invention.

As shown in FIG. 1, the endoscope objective lens in accordance with the first embodiment comprises, successively from the object side, a first lens group $G_1$ including at least one lens with a negative refracting power, a stop 1, and a second lens group $G_2$ with a positive refracting power; whereas the first lens group $G_1$ includes at least one lens with a negative refracting power having a diffraction optical surface. This endoscope objective lens further satisfies the following conditional expressions (1) and (2):

$$E > 0 \quad (1)$$

$$-2.0 < f_N/f < -0.3 \quad (2)$$

where

E is the coefficient of the second-order term of the phase difference function of the diffraction optical surface;

$f_N$ is the focal length of the lens having the diffraction optical surface and the strongest negative refracting power in the first lens group $G_1$; and f is the focal length of the whole lens system.

Here, in the endoscope objective lens in accordance with Example 1, the first lens group $G_1$, comprises, successively from the object side, a first lens $L_1$, made of a planoconcave lens having a concave surface directed onto the image side and a second lens $L_2$ made of a convex meniscus lens having a convex surface directed onto the object side; whereas the second lens group $G_2$ comprises, successively from the object side, a third lens $L_3$ made of a planoconvex lens having a convex surface directed onto the image side and a planar surface on the object side formed with the stop 1, and a cemented lens constituted by a fourth lens $L_4$ made of a convex meniscus lens having a convex surface directed onto the image side and a fifth lens $L_5$ made of a concave meniscus lens having a convex surface directed onto the image side. In Example 1 and the other Examples that will follow, the radius of curvature of the stop 1 is infinity.

Also, a filter portion 2 is disposed on the image side of the second lens group $G_2$, and a CCD device and an image fiber are disposed in an unshown space located further on the image side, so as to transmit image information. Here, X indicates the optical axis in FIG. 1.

In the endoscope objective lens in accordance with the first embodiment, at least one negative lens in the first lens group $G_1$, is provided with a diffraction optical surface which is represented by the following aspheric surface form expression and phase difference functional expression for the diffraction optical surface. In the endoscope objective lens in accordance with Example 1, the image-side surface of the first lens $L_1$ is formed as the diffraction optical surface.

Aspheric surface form expression of the diffraction optical surface:

$$Z = \frac{\frac{Y^2}{R}}{1+\sqrt{1-K\frac{Y^2}{R^2}}} + AY^4 + BY^6 + CY^8 + DY^{10}$$

where

Z is the length (mm) of the perpendicular to the tangential plane (the plane perpendicular to the optical axis) of an apex of the aspheric surface from a point on the aspheric surface at a height Y from the optical axis;

Y is the height (mm) from the optical axis;

K is the eccentricity;

R is the paraxial radius of curvature of the aspheric surface; and

A, B, C, and D are aspheric surface coefficients.

Phase difference functional expression of the diffraction optical surface:

$$\Phi(Y) = EY^2 + FY^4 + GY^6 + HY^8 + IY^{10}$$

where $\Phi(Y)$ is the diffraction optical surface phase difference function;

Y is the distance from the optical axis to the diffraction optical surface apex; and E, F, G, H, and I are aspheric surface coefficients.

Here, the diffraction optical surface optical path difference function defining the actual optical path difference caused by this diffraction optical surface is represented by:

$$\lambda \times \Phi(Y)/2\pi$$

where $\lambda$ is the wavelength, and $\Phi(Y)$ is the phase difference function.

As mentioned above, a diffraction optical surface has characteristic features of inverse dispersion and anomalous dispersion. By utilizing these characteristic features, the endoscope objective lens provided with the diffraction optical surface in accordance with the first embodiment can effectively correct chromatic aberration in magnification.

It is desirable that the set wavelength of the endoscope objective lens in accordance with the first embodiment be d-line (587.6 nm). When this wavelength is employed, the +first-order light generated by the diffraction optical surface is most efficiently converged near the stop 1. When the opening portion of the stop 1 is set to a predetermined size while the diffraction optical surface is disposed on the object side of the stop 1, substantially the whole light quantity of the +first-order light is transmitted alone through the stop 1, whereas most of unnecessary light can be cut off by the stop 1. The unnecessary light mentioned herein refers to, for example, the zero-order, first-order, second-order or higher-order diffracted light, generated by the diffraction optical surface, which is not utilized in terms of the lens design, or flare light occurring due to errors in manufacturing the lens and the like. These kinds of light may also become a cause for inhibiting the lens from achieving a high resolution. Though a very small part of the zero-order light transmitted through the diffraction optical surface, for example, passes through the opening portion of the stop 1 in the strict sense, it can be neglected since the light quantity thereof occupies only a very small proportion of the whole light quantity passing through the stop 1.

The individual conditional expressions will now be explained.

Conditional expression (1) defines a numerical range concerning the coefficient of the second-order term of the phase difference function of the diffraction optical surface. Since this range is defined, negative chromatic aberration in magnification of the lens system can favorably be corrected. If its lower limit is not satisfied, negative chromatic aberration in magnification will further increase.

Conditional expression (2) defines the power of the lens having the strongest negative refracting power as the lens having the diffraction optical surface in the first lens group $G_1$. When a lens having a strong negative power is formed with the diffraction optical surface, various aberrations can be corrected in a well-balanced manner if a power distribution defined by this numerical range is employed. Back focus may become too short if the lower limit of the range is not satisfied, whereas the negative power may become too strong if the upper limit is exceeded, whereby aberrations will be hard to correct.

Since a lens having a wide angle of view and a long back focus is required as the endoscope objective lens, a retrofocus type lens is typically used therein. Hence, a lens having a considerably strong negative power is disposed in the first lens group $G_1$, so as to secure a required back focus. In the first embodiment, a lens having a strong negative power in the first lens group $G_1$ is formed with the diffraction optical surface, thereby allowing chromatic aberration in magnification to be favorably corrected in a simple configuration.

The second embodiment of the present invention will now be explained with reference to FIG. 4.

Figure 4:
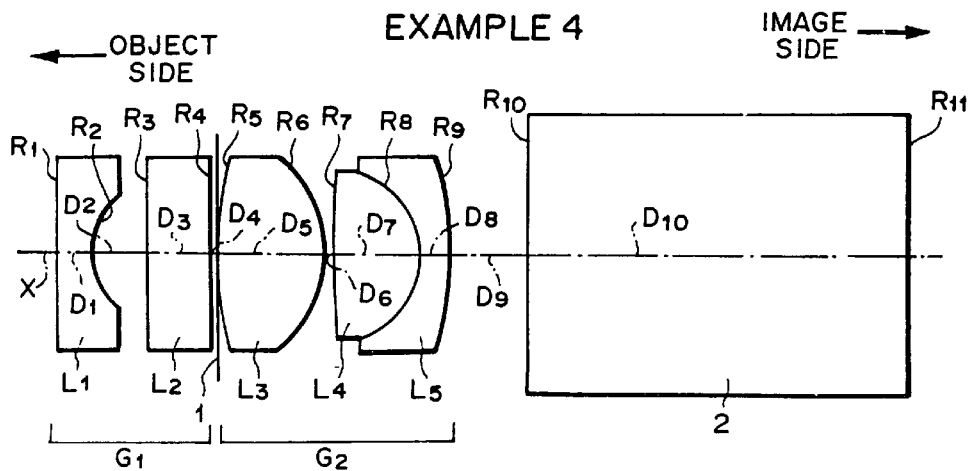
FIG. 4 is a view showing the configuration of the endoscope objective lens in accordance with Example 4.

Here, FIG. 4 shows the basic lens configuration of Example 4 as a representative of the second embodiment of the present invention.

As shown in FIG. 4, the endoscope objective lens in accordance with the second embodiment comprises, successively from the object side, a first lens group $G_1$ including at least one lens with a negative refracting power, a stop 1, and a second lens group $G_2$ with a positive refracting power; whereas the first lens group $G_1$ includes at least one lens with a negative refracting power having a diffraction optical surface. This endoscope objective lens further satisfies the following conditional expressions (1) and (3):

$$E > 0 \tag{1}$$

$$f_N/f < -100 \tag{3}$$

where
E is the coefficient of the second-order term of the phase difference function of the diffraction optical surface;
$f_N$ is the focal length of the lens having the diffraction optical surface and the strongest negative refracting power in the first lens group $G_1$; and
f is the focal length of the whole lens system.

Here, in the endoscope objective lens in accordance with Example 4, the first lens group $G_1$ comprises, successively from the object side, a first lens $L_1$ made of a planoconcave lens having a concave surface directed onto the image side and a second lens $L_2$ having planar surfaces on both sides with a diffraction optical surface formed on the object side; whereas the second lens group $G_2$ comprises, successively from the object side, a third lens $L_3$ made of a biconvex lens having a surface with a greater curvature directed onto the image side, and a cemented lens constituted by a fourth lens $L_4$ made of a biconvex lens having a surface with a greater curvature directed onto the image side and a fifth lens $L_5$ made of a concave meniscus lens having a convex surface directed onto the image side. Here, the stop 1 is disposed at a paraxial position in contact with the image-side surface apex of the second lens $L_2$. The other configuration and the aspheric surface form expression and phase difference functional expression of the diffraction optical surface are substantially the same as those of the first embodiment.

By utilizing the diffraction optical surface, chromatic aberration in magnification can effectively be corrected in the second embodiment as well. Also, when a set wavelength similar to that of the first embodiment is employed while the diffraction optical surface is disposed on the object side of the stop 1, most of unnecessary light can be cut off by the stop 1, thus allowing the lens to attain a higher resolution.

Conditional expression (3) defines the power of the lens having the strongest negative refracting power as the lens having the diffraction optical surface in the first lens group $G_1$. When a planar lens surface is formed with a diffraction optical surface, the power of the refracting system of this surface is nearly zero, whereby the power of this surface depends on the power inherent in the diffraction optical surface. As E>0 according to conditional expression (1), the power inherent in this diffraction optical surface becomes negative. When a power distribution defined by the numerical range of conditional expression (3) is employed, various aberrations can be corrected in a well-balanced manner. If the power of the plate diffraction optical surface is so strong that the upper limit of conditional expression (3) is exceeded, it may be out of balance with respect to other refractive lenses, whereby aberrations may be hard to correct. For strengthening the plate diffraction optical surface beyond the upper limit, it is necessary for the diffraction optical surface to have a finer zonal pitch, whereby productivity may deteriorate.

The third embodiment of the present invention will now be explained with reference to FIG. 5.

Figure 5:
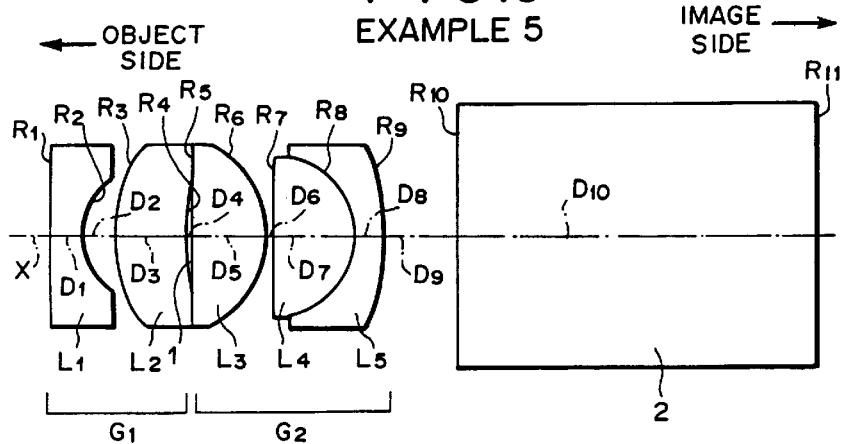
FIG. 5 is a view showing the configuration of the endoscope objective lens in accordance with Example 5.

Here, FIG. 5 shows the basic lens configuration of Example 5 as a representative of the third embodiment of the present invention.

As shown in FIG. 5, the endoscope objective lens in accordance with the third embodiment comprises, successively from the object side, a first lens group $G_1$ including at least one lens with a negative refracting power, a stop 1, and a second lens group $G_2$ with a positive refracting power; whereas the first lens group $G_1$ includes at least one lens with a positive refracting power having a diffraction optical surface. This endoscope objective lens further satisfies the following conditional expressions (4) and (5):

$$E > 0 \quad (4)$$

$$1.0 < f_P/f \quad (5)$$

where

E is the coefficient of the second-order term of the phase difference function of the diffraction optical surface;

$f_P$ is the focal length of the lens having the diffraction optical surface and the strongest positive refracting power in the first lens group $G_1$; and f is the focal length of the whole lens system.

Here, in the endoscope objective lens in accordance with Example 5, the first lens group $G_1$ comprises, successively from the object side, a first lens $L_1$ made of a planoconcave lens having a concave surface directed onto the image side and a second lens $L_2$ made of a positive meniscus lens having a convex surface directed onto the object side; whereas the second lens group $G_2$ comprises, successively from the object side, a third lens $L_3$ made of a planoconvex lens having a convex surface directed onto the image side and a planar surface on the object side formed with the stop 1, and a cemented lens constituted by a fourth lens $L_4$ made of a planoconvex lens having a convex surface directed onto the image side and a fifth lens $L_5$ made of a concave meniscus lens having a convex surface directed onto the image side. In the endoscope objective lens in accordance with Example 5, the object-side surface of the second lens $L_2$ is formed as a diffraction optical surface. The other configuration and the aspheric surface form expression and phase difference functional expression of the diffraction optical surface are substantially the same as those of the first embodiment. By utilizing the diffraction optical surface, chromatic aberration in magnification can effectively be corrected in the third embodiment as well. Also, when a set wavelength similar to that of the first embodiment is employed while the diffraction optical surface is disposed on the object side of the stop 1, most of unnecessary light can be cut off by the stop 1, thus allowing the lens to attain a higher resolution.

Conditional expression (5) defines the power of the lens having the strongest positive refracting power as the lens having the diffraction optical surface in the first lens group $G_1$. It is not always necessary for the diffraction optical surface to be formed on a surface having a negative refracting power. It can be formed on a surface having a positive refracting power as shown in the third embodiment. In this case, the lens with a positive refracting power in the first lens group $G_1$ having a negative refracting power is employed, whereby the numerical range of conditional expression (5) is required for securing a required back focus while correcting various aberrations in a well-balanced manner. If the lower limit of the range is not satisfied, the back focus may become too short.

In the following, Examples 1 to 7 of the present invention will be explained specifically.

EXAMPLE 1

The configuration of the endoscope objective lens in accordance with Example 1 is as mentioned above.

Table 1 shows the radius of curvature R (mm) of each lens surface, axial surface space of each lens (center thickness of each lens and air space between neighboring lenses) D (mm), refractive index N of each lens at d-line, and Abbe number ν of each lens in Example 1. Also, the lower part of Table 1 shows the values of individual constants of the diffraction optical surface indicated by the above-mentioned aspheric surface form expression and phase difference functional expression of the diffraction optical surface in Example 1.

In each of Examples 1 to 7, the focal length f of the whole lens system is set to 1.00 mm. Also, in Table 1 and its subsequent Tables, numbers referring to letters successively increase from the object side, and "*" marked on the left side of numbers indicates a diffraction optical surface.

TABLE 1

| Surface | R | D | Nd | ν |
|---|---|---|---|---|
| 1 | ∞ | 0.2100 | 1.7881 | 49.2 |
| *2 | 0.5644 | 0.2257 | | |
| 3 | 2.7330 | 0.5144 | 1.8000 | 25.0 |
| 4 | 5.5845 | 0.0263 | | |
| 5 | ∞ | 0.4948 | 1.5397 | 47.5 |
| 6 | −0.7419 | 0.0525 | | |
| 7 | −10.8168 | 0.5512 | 1.7208 | 55.5 |
| 8 | −0.5741 | 0.2100 | 1.8000 | 25.0 |
| 9 | −1.3744 | 0.4987 | | |
| 10 | ∞ | 2.4672 | 1.5163 | 64.1 |
| 11 | ∞ | | | |

Second surface

| K | A | B | C | D |
|---|---|---|---|---|
| 1.0000 | $4.3654 \times 10^{-1}$ | −2.7851 | 0.0 | 0.0 |
| E | F | G | H | I |
| $4.8154 \times 10^{-1}$ | $5.1027 \times 10$ | $4.2617 \times 10^3$ | $1.9515 \times 10^5$ | $-5.8775 \times 10^5$ |

In Example 1, the respective values corresponding to conditional expressions (1) and (2) are $E = 4.8154 \times 10^{-1}$ and $f_N/f = -0.72$, thus satisfying each of the conditional expressions.

EXAMPLE 2

The endoscope objective lens in accordance with Example 2 has the basic configuration mentioned in the first embodiment but differs therefrom in its lens configuration.

Figure 2:
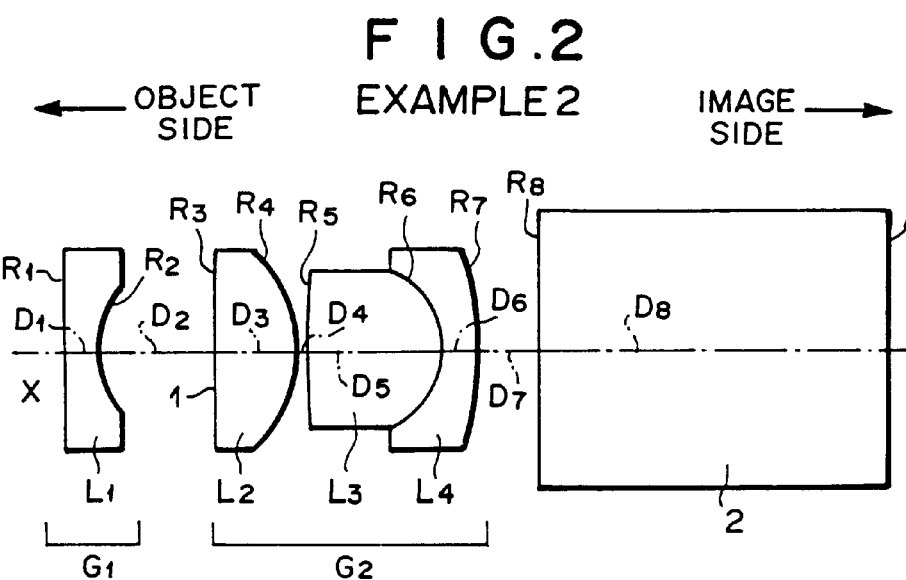
FIG. 2 is a view showing the configuration of the endoscope objective lens in accordance with Example 2.

Here, as shown in FIG. 2, the first lens group $G_1$ is constituted by a first lens $L_1$ made of a planoconcave lens having a concave surface directed onto the image side; whereas the second lens group $G_2$ comprises, successively from the object side, a second lens $L_2$ made of a planoconvex lens having a convex surface directed onto the image side and a planar surface on the object side formed with a stop 1, and a cemented lens constituted by a third lens $L_3$ made of a biconvex lens having a surface with a greater curvature directed onto the image side and a fourth lens $L_4$ made of a concave meniscus lens having a convex surface directed onto the image side.

In the endoscope objective lens in accordance with Example 2, the image-side surface of the first lens $L_1$ is provided with a diffraction optical surface.

Table 2 shows the radius of curvature R (mm) of each lens surface, axial surface space of each lens (center thickness of each lens and air space between neighboring lenses) D (mm), refractive index N of each lens at d-line, and Abbe number ν of each lens in Example 2. Also, the lower part of Table 2 shows the values of individual constants of the diffraction optical surface indicated by the above-mentioned aspheric surface form expression and phase difference functional expression of the diffraction optical surface in Example 2.

TABLE 2

| Surface | R | D | Nd | ν |
|---|---|---|---|---|
| 1 | ∞ | 0.1981 | 1.7331 | 54.7 |
| *2 | 0.6603 | 0.6501 | | |
| 3 | ∞ | 0.4817 | 1.5663 | 43.5 |
| 4 | −0.8048 | 0.0495 | | |
| 5 | 10.7220 | 0.7640 | 1.7624 | 51.8 |
| 6 | −0.5230 | 0.1981 | 1.8000 | 25.0 |

TABLE 2-continued

| | | | | |
|---|---|---|---|---|
| 7 | −2.2277 | 0.3714 | | |
| 8 | ∞ | 1.9807 | 1.5163 | 64.1 |
| 9 | ∞ | | | |
| Second surface | | | | |

| K | A | B | C | D |
|---|---|---|---|---|
| 1.0000 | $3.0323 \times 10^{-1}$ | 2.9034 | 0.0 | 0.0 |
| E | F | G | H | I |
| $4.7550 \times 10^{-1}$ | $1.0887 \times 10^{2}$ | $9.1139 \times 10^{3}$ | $-7.5321 \times 10^{4}$ | $3.9155 \times 10^{5}$ |

In Example 2, the respective values corresponding to conditional expressions (1) and (2) are $E=4.7550 \times 10^{-1}$ and $f_N/f=-0.90$, thus satisfying each of the conditional expressions.

EXAMPLE 3

The endoscope objective lens in accordance with Example 3 has the basic configuration mentioned in the first embodiment but differs therefrom in its lens configuration.

Figure 3:
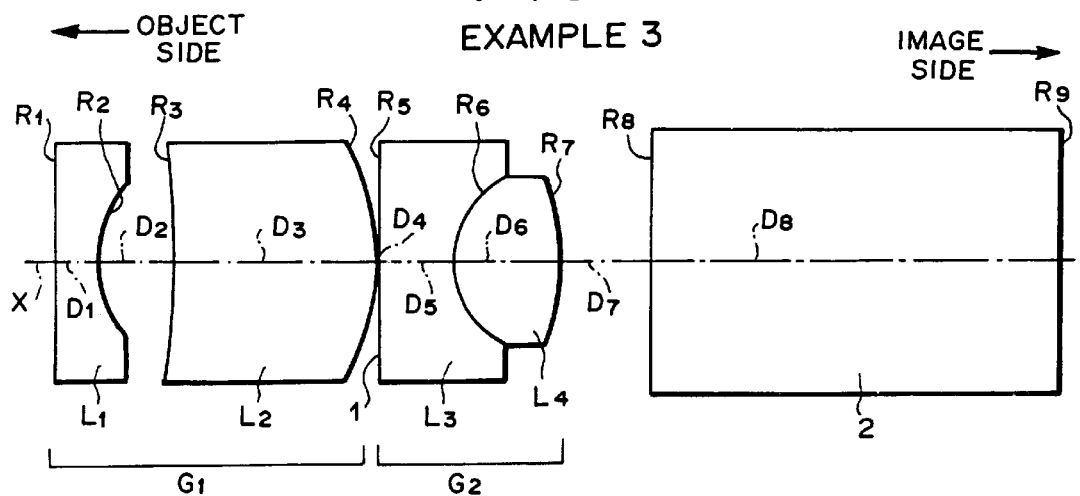
FIG. 3 is a view showing the configuration of the endoscope objective lens in accordance with Example 3.

Here, as shown in FIG. 3, the first lens group $G_1$ comprises, successively from the object side, a first lens $L_1$ made of a planoconcave lens having a concave surface directed onto the image side and a second lens $L_2$ made of a convex meniscus lens having a convex surface directed onto the image side; whereas the second lens group $G_2$ comprises a cemented lens constituted, successively from the object side, by a third lens $L_3$ made of a planoconcave lens having a concave surface directed onto the image side and a planar surface on the object side formed with a stop 1 and a fourth lens $L_4$ made of a biconvex lens having a surface with a greater curvature directed onto the object side.

In the endoscope objective lens in accordance with Example 3, the image-side surface of the first lens $L_1$ is provided with a diffraction optical surface.

Table 3 shows the radius of curvature R (mm) of each lens surface, axial surface space of each lens (center thickness of each lens and air space between neighboring lenses) D (mm), refractive index N of each lens at d-line, and Abbe number ν of each lens in Example 3. Also, the lower part of Table 3 shows the values of individual constants of the diffraction optical surface indicated by the above-mentioned aspheric surface form expression and phase difference functional expression of the diffraction optical surface in Example 3.

TABLE 3

| Surface | R | D | Nd | ν |
|---|---|---|---|---|
| 1 | ∞ | 0.28564 | 1.7450 | 53.5 |
| *2 | 0.8253 | 0.49852 | | |
| 3 | −5.8630 | 1.35630 | 1.8100 | 24.5 |
| 4 | −1.6276 | 0.0 | | |
| 5 | ∞ | 0.50686 | 1.7624 | 27.2 |
| 6 | 0.6165 | 0.71410 | 1.7357 | 54.4 |
| 7 | −1.5814 | 0.60699 | | |
| 8 | ∞ | 2.71358 | 1.5163 | 64.1 |
| 9 | ∞ | | | |
| Second surface | | | | |

| K | A | B | C | D |
|---|---|---|---|---|
| 1.0000 | $1.2304 \times 10^{-1}$ | $2.0430 \times 10^{1}$ | 0.0 | 0.0 |
| E | F | G | H | I |
| $1.0501 \times 10^{-2}$ | $9.6842 \times 10^{-1}$ | $8.1467 \times 10$ | $3.9491 \times 10^{3}$ | $1.4094 \times 10^{4}$ |

In Example 3, the respective values corresponding to conditional expressions (1) and (2) are $E=1.0501 \times 10^{-2}$ and $f_N/f=-1.11$, thus satisfying each of the conditional expressions.

EXAMPLE 4

The configuration of the endoscope objective lens in accordance with Example 4 is as mentioned above.

Table 4 shows the radius of curvature R (mm) of each lens surface, axial surface space of each lens (center thickness of each lens and air space between neighboring lenses) D (mm), refractive index N of each lens at d-line, and Abbe number ν of each lens in Example 4. Also, the lower part of Table 4 shows the values of individual constants of the diffraction optical surface indicated by the above-mentioned aspheric surface form expression and phase difference functional expression of the diffraction optical surface in Example 4.

TABLE 4

| Surface | R | D | Nd | ν |
|---|---|---|---|---|
| 1 | ∞ | 0.2163 | 1.6260 | 60.1 |
| 2 | 0.4597 | 0.3786 | | |
| *3 | ∞ | 0.4326 | 1.7997 | 25.0 |
| 4 | ∞ | 0.0270 | | |
| 5 | 3.1138 | 0.6976 | 1.5475 | 46.1 |
| 6 | −0.8177 | 0.0768 | | |
| 7 | 20.8727 | 0.5678 | 1.6633 | 58.3 |
| 8 | −0.6014 | 0.2163 | 1.7998 | 25.0 |
| 9 | −1.9243 | 0.5138 | | |
| 10 | ∞ | 2.5418 | 1.5163 | 64.1 |
| 11 | ∞ | | | |
| Third Surface | | | | |

| K | A | B | C | D |
|---|---|---|---|---|
| 1.0000 | 0.0 | 0.0 | 0.0 | 0.0 |
| E | F | G | H | I |
| $7.5022 \times 10^{-3}$ | $1.3476 \times 10$ | $6.6952 \times 10^{2}$ | $2.6978 \times 10^{4}$ | $-7.5906 \times 10^{5}$ |

In Example 4, the respective values corresponding to conditional expressions (1) and (3) are $E=7.5022 \times 10^{3}$ and $f_N/f=-7.13 \times 10^{5}$, thus satisfying each of the conditional expressions.

EXAMPLE 5

The configuration of the endoscope objective lens in accordance with Example 5 is as mentioned above.

Table 5 shows the radius of curvature R (mm) of each lens surface, axial surface space of each lens (center thickness of each lens and air space between neighboring lenses) D (mm), refractive index N of each lens at d-line, and Abbe number ν of each lens in Example 5. Also, the lower part of Table 5 shows the values of individual constants of the diffraction optical surface indicated by the above-mentioned aspheric surface form expression and phase difference functional expression of the diffraction optical surface in Example 5.

TABLE 5

| Surface | R | D | Nd | ν |
|---|---|---|---|---|
| 1 | ∞ | 0.2154 | 1.7518 | 52.8 |
| 2 | 0.4651 | 0.2316 | | |
| *3 | 1.5597 | 0.5278 | 1.8000 | 25.0 |
| 4 | 3.1672 | 0.0269 | | |
| 5 | ∞ | 0.5153 | 1.5060 | 53.9 |
| 6 | −0.7209 | 0.0539 | | |
| 7 | ∞ | 0.5655 | 1.7434 | 53.7 |
| 8 | −0.5762 | 0.2154 | 1.8000 | 25.0 |
| 9 | −1.6032 | 0.5251 | | |

TABLE 5-continued

| | | | | |
|---|---|---|---|---|
| 10 | ∞ | 2.5314 | 1.5163 | 64.1 |
| 11 | ∞ | | | |

Third Surface

| K | A | B | C | D |
|---|---|---|---|---|
| 1.0000 | $3.8212 \times 10^{-2}$ | 1.1096 | 0.0 | 0.0 |
| E | F | G | H | I |
| $2.2001 \times 10^{-2}$ | $9.3398 \times 10^{-1}$ | $4.7143 \times 10$ | $5.1950 \times 10^3$ | $4.6951 \times 10^5$ |

In Example 5, the respective values corresponding to conditional expressions (4) and (5) are $E = 2.2001 \times 10^{-2}$ and $f_P/f = 3.35$, thus satisfying each of the conditional expressions.

EXAMPLE 6

The endoscope objective lens in accordance with Example 6 has the basic configuration mentioned in the third embodiment but differs therefrom in its lens configuration.

Figure 6:
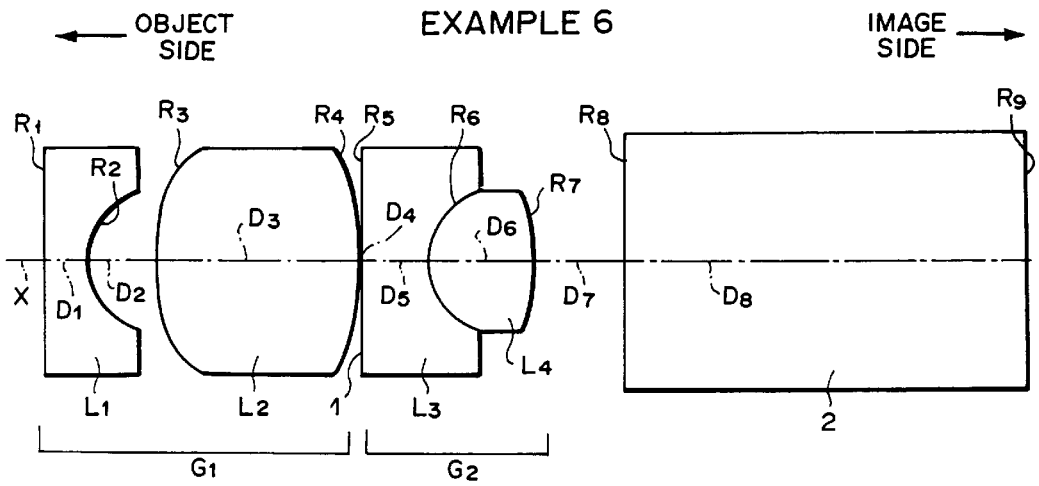
FIG. 6 is a view showing the configuration of the endoscope objective lens in accordance with Example 6.

Here, as shown in FIG. 6, the first lens group $G_1$ comprises, successively from the object side, a first lens $L_1$ made of a planoconcave lens having a concave surface directed onto the image side and a second lens $L_2$ made of a biconvex lens having a surface with a greater curvature directed onto the image side; whereas the second lens group $G_2$ comprises a cemented lens constituted, successively from the object side, by a third lens $L_3$ made of a planoconcave lens having a concave surface directed onto the image side and a planar surface on the object side formed with a stop 1 and a fourth lens $L_4$ made of a biconvex lens having a surface with a greater curvature directed onto the object side.

In the endoscope objective lens in accordance with Example 6, the object-side surface of the second lens $L_2$ is provided with a diffraction optical surface.

Table 6 shows the radius of curvature R (mm) of each lens surface, axial surface space of each lens (center thickness of each lens and air space between neighboring lenses) D (mm), refractive index N of each lens at d-line, and Abbe number ν of each lens in Example 6. Also, the lower part of Table 6 shows the values of individual constants of the diffraction optical surface indicated by the above-mentioned aspheric surface form expression and phase difference functional expression of the diffraction optical surface in Example 6.

TABLE 6

| Surface | R | D | Nd | ν |
|---|---|---|---|---|
| 1 | ∞ | 0.3054 | 1.7250 | 56.9 |
| 2 | 0.5477 | 0.4761 | | |
| *3 | 3.6638 | 1.4507 | 1.8144 | 24.9 |
| 4 | -2.0784 | 0.0 | | |
| 5 | ∞ | 0.4658 | 1.8081 | 25.3 |
| 6 | 0.5393 | 0.7636 | 1.7782 | 48.4 |
| 7 | -1.6655 | 0.6490 | | |
| 8 | ∞ | 2.9091 | 1.5163 | 64.1 |
| 9 | ∞ | | | |

Third Surface

| K | A | B | C | D |
|---|---|---|---|---|
| 1.0000 | $1.9640 \times 10^{-1}$ | $3.6461 \times 10^{-1}$ | o*o | 0.0 |
| E | F | G | H | I |
| $3.8070 \times 10^{-3}$ | 1.1340 | $5.1881 \times 10$ | $1.1660 \times 10^3$ | $-2.8924 \times 10^4$ |

In Example 6, the respective values corresponding to conditional expressions (4) and (5) are $E = 3.8070 \times 10^{-3}$ and $f_P/f = 1.84$, thus satisfying each of the conditional expressions.

EXAMPLE 7

The configuration of the endoscope objective lens in accordance with Example 7 satisfies both of the above-mentioned first and third embodiments. Namely, in the first lens group $G_1$, each of the respective lenses having positive and negative refracting powers is provided with a diffraction optical surface, and conditional expressions (1), (2), and (5) are satisfied. Here, conditional expression (4) will be omitted since it is the same as conditional expression (1).

Figure 7:
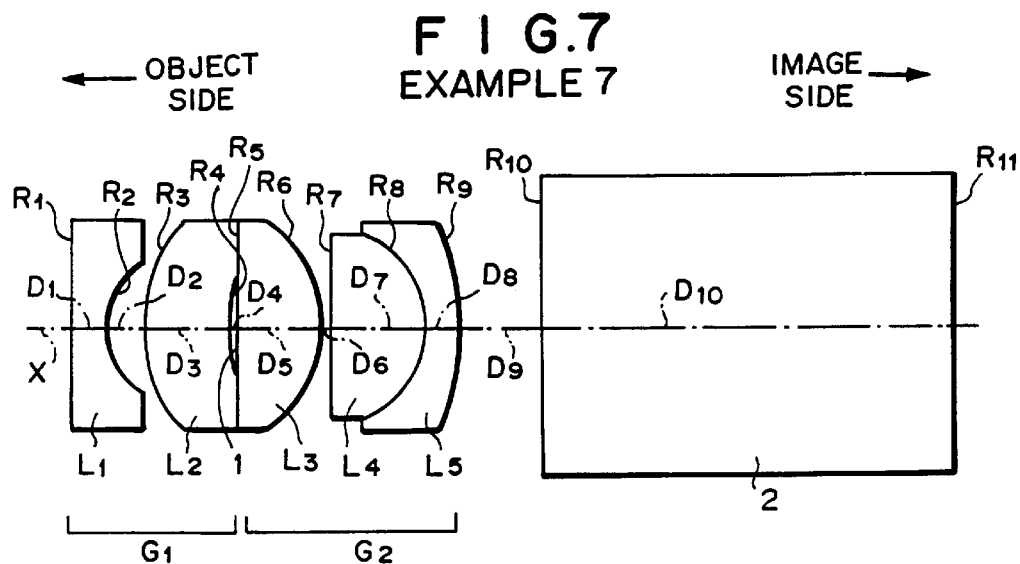
FIG. 7 is a view showing the configuration of the endoscope objective lens in accordance with Example 7.
Figures 8A, 8B, 8C, 8D:
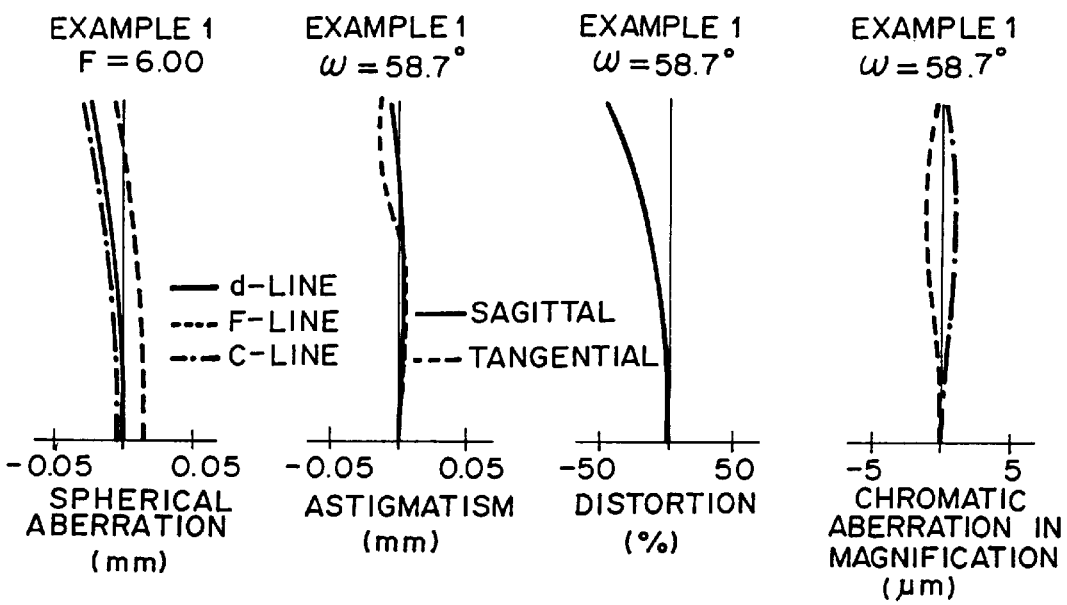
FIGS. 8A to 8D are aberration charts of the endoscope objective lens in accordance with Example 1.

Here, as shown in FIG. 7, the first lens group $G_1$ comprises, successively from the object side, a first lens $L_1$ made of a planoconcave lens having a concave surface directed onto the image side and a second lens $L_2$ made of a positive meniscus lens having a convex surface directed onto the object side; whereas the second lens group $G_2$ comprises, successively from the object side, a third lens $L_3$ made of a planoconvex lens $L_3$ having a convex surface directed onto the image side and a planar surface on the object side formed with a stop 1, and a cemented lens constituted by a fourth lens $L_4$ made of a planoconvex lens having a convex surface directed onto the image side and a fifth lens $L_5$ made of a concave meniscus lens having a convex surface directed onto the image side. Here, the object-side surface of each of the first lens $L_1$ and second lens $L_2$ is formed as a diffraction optical surface. The other configuration and the aspheric surface form expression and phase difference functional expression of the diffraction optical surface are substantially the same as those of the first and third embodiments.

Table 7 shows the radius of curvature R (mm) of each lens surface, axial surface space of each lens (center thickness of each lens and air space between neighboring lenses) D (mm), refractive index N of each lens at d-line, and Abbe number ν of each lens in Example 7. Also, the lower part of Table 7 shows the values of individual constants of the diffraction optical surfaces indicated by the above-mentioned aspheric surface form expression and phase difference functional expression of the diffraction optical surface in Example 7.

TABLE 7

| Surface | R | D | $N_d$ | ν |
|---|---|---|---|---|
| *1 | ∞ | 0.2145 | 1.7517 | 52.8 |
| 2 | 0.4607 | 0.2306 | | |
| *3 | 1.5713 | 0.5256 | 1.8000 | 25.0 |
| 4 | 3.0940 | 0.0268 | | |
| 5 | ∞ | 0.5242 | 1.5550 | 44.7 |
| 6 | -0.7516 | 0.0536 | | |
| 7 | ∞ | 0.5631 | 1.7304 | 55.o |
| 8 | -0.6057 | 0.2145 | 1.8000 | 25.0 |
| 9 | -1.6274 | 0.5095 | | |
| 10 | ∞ | 2.5207 | 1.5163 | 64.1 |
| 11 | ∞ | | | |

First Surface

| K | A | B | C | D |
|---|---|---|---|---|
| 1.0000 | 0.0 | 0.0 | 0.0 | 0.0 |
| E | F | G | H | I |
| $2.2127 \times 10^{-2}$ | 7.5466 | $9.6019 \times 10^2$ | $-7.1780 \times 10^2$ | $-4.1860 \times 10^3$ |

Third Surface

| K | A | B | C | D |
|---|---|---|---|---|
| 1.0000 | $8.4237 \times 10^{-2}$ | 1.0972 | 0.0 | 0.0 |
| E | F | G | H | I |
| $1.6499 \times 10^{-2}$ | $7.0533 \times 10^{-1}$ | $4.0221 \times 10$ | $6.8284 \times 10^3$ | $7.6216 \times 10^5$ |

In Example 7, the respective values corresponding to conditional expressions (1), (2), and (5) are $E = 2.2127 \times 10^{-2}$ in the first lens $L_1E=1.6499\times10^{-2}$ in the second lens $L_2$, $f_N/f=-0.61$, and $f_P/f=3.46$, thus satisfying each of the conditional expressions.

FIGS. 8 to 14 are aberration charts showing various aberrations (spherical aberration, astigmatism, distortion, and chromatic aberration in magnification) of the endoscope objective lenses in accordance with Examples 1 to 7, respectively. In these aberration charts, ω indicates the half angle of view.

As can be seen from FIGS. 8 to 14, it is clear that the endoscope objective lenses in accordance with Examples 1 to 7 favorably correct chromatic aberration in magnification in particular.

Without being restricted to those of the above-mentioned Examples, the endoscope objective lens in accordance with the present invention can be modified in various manners. For example, the radius of curvature R and lens space (or lens thickness) D of each lens can appropriately be changed.

In the endoscope objective lens in accordance with the present invention, as explained in the foregoing, chromatic aberration in magnification in particular is favorably corrected by using a diffraction optical surface and, as this diffraction optical surface is disposed on the object side of the stop, adverse effects of diffracted light, generated due to the use of the diffraction optical surface, which is unnecessary in terms of design, flare light occurring due to errors in manufacture or the like, and so forth can be suppressed, whereby an endoscope objective lens applicable to the achievement of a higher resolution can be obtained.

What is claimed is:

1. An endoscope objective lens comprising, successively from an object side, a first lens group having at least one lens with a negative refracting power, a stop, and a second lens group having a positive refracting power, said first lens group including at least one lens having a diffraction optical surface, said diffraction optical surface satisfying the following conditional expression (1):

$$E>0 \tag{1}$$

where

E is the coefficient of the second-order term of the phase difference function of the diffraction optical surface.

2. An endoscope objective lens according to claim 1, wherein said first lens group includes at least one lens with a negative refracting power having a diffraction optical surface, and wherein a lens having the strongest negative refracting power as the lens having said diffraction optical surface in said first lens group satisfies the following conditional expression (2):

$$-2.0<f_N/f<-0.3 \tag{2}$$

where $f_N$ is the focal length of the lens having the diffraction optical surface and the strongest negative refracting power in the first lens group; and f is the focal length of the whole lens system.

3. An endoscope objective lens according to claim 1, wherein said first lens group includes at least one lens with a negative refracting power having a diffraction optical surface, and wherein a lens having the strongest negative refracting power as the lens having said diffraction optical surface in said first lens group satisfies the following conditional expression (3):

$$f_N/f<-100 \tag{3}$$

where $f_N$ is the focal length of the lens having the diffraction optical surface and the strongest negative refracting power in the first lens group; and f is the focal length of the whole lens system.

4. An endoscope objective lens comprising, successively from an object side, a first lens group having at least one lens with a negative refracting power, a stop, and a second lens group having a positive refracting power, said first lens group including at least one lens with a positive refracting power having a diffraction optical surface, a lens having the strongest positive refracting power as the lens having said diffraction optical surface in said first lens group satisfying the following conditional expressions (4) and (4):

$$E>0 \tag{4}$$

$$1.0<f_P/f \tag{5}$$

where

E is the coefficient of the second-order term of the phase difference function of the diffraction optical surface;

$f_P$ is the focal length of the lens having the diffraction optical surface and the strongest positive refracting power in the first lens group; and f is the focal length of the whole lens system.

* * * * *

UNITED STATES PATENT AND TRADEMARK OFFICE
CERTIFICATE OF CORRECTION

PATENT NO. : 6,181,481 B1
DATED : January 30, 2001
INVENTOR(S) : Chikara Yamamoto; Hitoshi Miyano It is certified that error appears in the above-identified patent and that said Letters Patent is hereby corrected as shown below:

Column 14,
Line 34 (Claim 4), please delete "(4) and (4)" and substitute therefore -- (4) and (5) --.

Signed and Sealed this

Twenty-third Day of October, 2001

Attest:

NICHOLAS P. GODICI
Attesting Officer
Acting Director of the United States Patent and Trademark Office